(12) United States Patent
Ku

(10) Patent No.: US 9,771,120 B2
(45) Date of Patent: Sep. 26, 2017

(54) SCOOTER

(71) Applicant: Cheng-Kun Ku, Xinbei (TW)

(72) Inventor: Cheng-Kun Ku, Xinbei (TW)

( * ) Notice: Subject to any disclaimer, the term of this patent is extended or adjusted under 35 U.S.C. 154(b) by 20 days.

(21) Appl. No.: 14/996,263

(22) Filed: Jan. 15, 2016

(65) Prior Publication Data

US 2017/0190377 A1  Jul. 6, 2017

(51) Int. Cl.
*B62K 15/00* (2006.01)
*B62D 61/04* (2006.01)

(52) U.S. Cl.
CPC ............ *B62K 15/008* (2013.01); *B62D 61/04* (2013.01); *B62K 2015/001* (2013.01)

(58) Field of Classification Search
CPC  B62K 2015/001; B62K 15/00; B62K 15/008; B62D 61/06
See application file for complete search history.

(56) References Cited

U.S. PATENT DOCUMENTS 3,485,508 A * 12/1969 Hudnall ................... B62K 3/00
                                                          280/234
8,162,345 B1 * 4/2012 Szu-Yao .............. B62K 15/008
                                                          280/278

9,475,338 B2 * 10/2016 Ohashi ...................... B44C 1/14
2013/0062842 A1 * 3/2013 Moldestad ........... B62K 15/008
                                                          280/40
2014/0203538 A1 * 7/2014 Huang ...................... B62J 1/08
                                                          280/639
2016/0203538 A1 * 7/2016 Smits ................. G06O 30/0635
                                                          705/26.61

FOREIGN PATENT DOCUMENTS

| CN | WO-2016045318 A1 * | 3/2016 | .............. B62M 6/50 |
| IL | WO-2016139660 A1 * | 9/2016 | .............. B62M 3/02 |
| JP | 3130485 B2 * | 1/2001 | |
| TW | EP-2492175 A1 * | 8/2012 | ........... B62K 15/008 |

* cited by examiner

*Primary Examiner* — James A English
(74) *Attorney, Agent, or Firm* — Alan D. Kamrath; Kamrath IP Lawfirm, P.A.

(57) ABSTRACT

A scooter includes a frame where a positioning unit is disposed, a control rod, a front wheel, a braking device, two pedals, a saddle, and at least one rear wheel. A sliding trough is formed on a bottom of the frame. A folding device is situated between the control rod and the frame and has a body fixed to the control rod, an operating unit disposed on the body and sliding within the sliding trough, and an engagement unit capable of engaging the frame with the body. The engagement between the positioning unit and the engagement unit can spread the frame and the control rod easily with less labor and facilitate a riding action. The positioning unit can also be separated from the engagement unit to fold the frame and the control rod, thereby reducing the volume of the scooter and increasing the convenience of carrying and stowing.

5 Claims, 15 Drawing Sheets

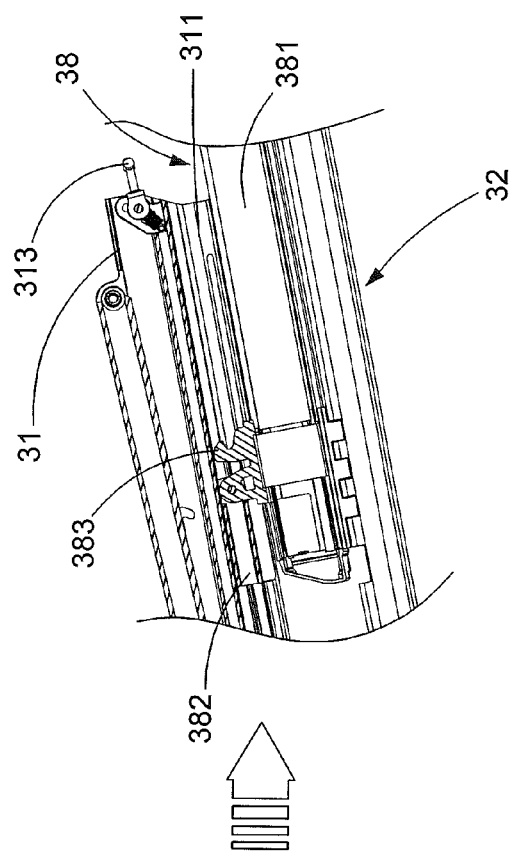
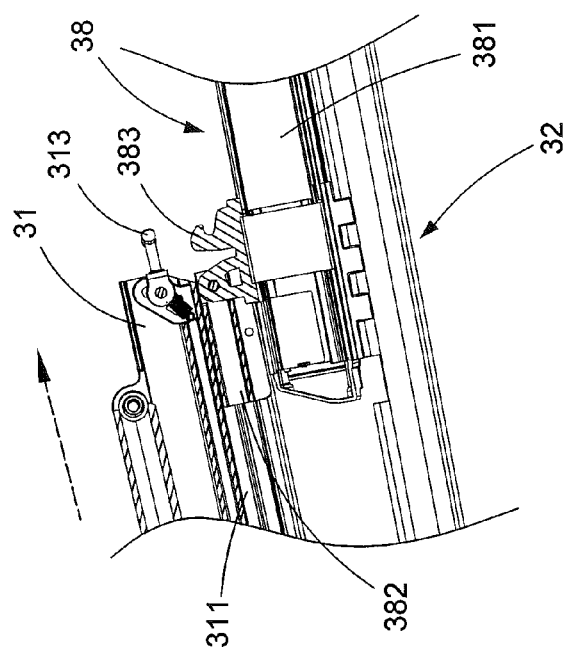
FIG. 5A
FIG. 5B

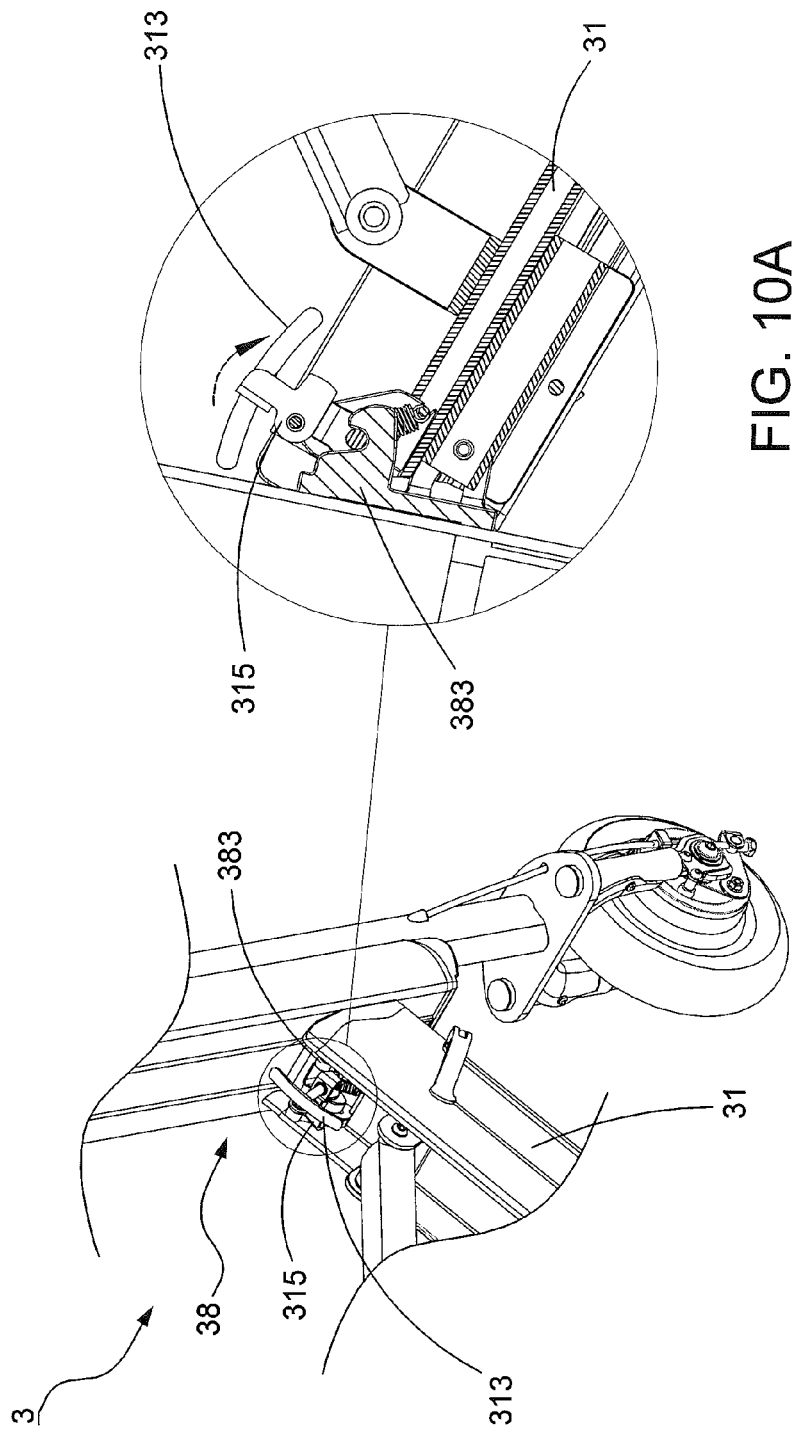

SCOOTER

BACKGROUND OF THE INVENTION

1. Field of the Invention

This invention relates to a scooter and relates particularly to a scooter can be folded and unfolded with ease to carry and stow conveniently.

2. Description of the Related Art

Referring to FIG. 1 and FIG. 2, a conventional foldable scooter 1 includes a fork 11, a handlebar rod 12, a main rod 13, a lifting device 14, and a shift rod set 15. The lifting device 14 has a fixing set 141, a first locking set 142, and a second locking set 143. The fixing set 141 includes an inner bushing 1411 placed in the fixing set 141 and also includes a first fixing part 1412 and a second fixing part 1413 disposed on opposite sides thereof. Further, the first locking set 142 has a rotational handle 1421 with a screwing portion extending through the first fixing part 1412 and a first nut 1422 engaging the rotational handle 1421. Thus, the fixing set 141 can be fixed to the fork 11. The second locking set 143 has a male screw 1432 penetrating through the second fixing part 1413 and a female screw 1431 fixing to the male screw 1432, thereby connecting the second fixing part 1413 with the shift rod set 15 and allowing the shift rod set 15 to go up and down by the movement of the fixing set 141 of the lifting device 14 along the fork 11. Therefore, the foldable scooter 1 can be folded or unfolded.

However, the conventional foldable scooter 1 still has problems. First, although the lifting device 14 can move upwards and downwards by the fixing set 141 and the inner bushing 1411 located inside the fixing set 141, the fixing set 141 still cannot be fixed to the inner bushing 1411. This situation causes the inner bushing 1411 to separate from the fixing set 141 easily during the riding. Accordingly, the inner bushing 1411 cannot perform well and cannot assist the fixing set 141 in connecting to the fork 11 stably, and the lifting device 14 can not lift along the fork 11 because of the unstable connection between the fixing set 141 and the fork 11. Thus, the folding and unfolding effect of the foldable scooter 1 is affected.

Second, without a positioning device set between the lifting device 14 and the shift rod set 15, the user is unable to know whether the foldable scooter 1 completes the unfolding or folding actions while spreading or collecting the foldable scooter 1. Thus, the using convenience of the foldable scooter 1 is reduced.

Third, the lifting device 14 is fixed to the fork 11 by the rotational handle 1421 with the screwing portion of the first locking set 142. However, the screwing portion of the rotational handle 1421 may loosen from the first nut 1422 if the rotational handle 1421 is carelessly hit by hands of the user or other external force. Therefore, the fixing set 141 cannot be fastened on the fork 11 stably. This causes the lifting device 14 to become loose and drop and affects the folding or unfolding effect of the foldable scooter 1. Hence, the conventional foldable scooter 1 needs to be improved.

SUMMARY OF THE INVENTION

The object of this invention is to provide a scooter can be folded and unfolded easily with less labor and can be carried and stowed conveniently.

The scooter of this invention comprises a frame, a control rod connected to the frame, a front wheel pivotally set on the control rod, a braking device installed on the control rod, two pedals respectively situated at two sides of the frame, a saddle disposed on the frame, at least one rear wheel pivotally set on the frame, and a folding device located between the frame and the control rod. A sliding trough is formed on a bottom of the frame and a positioning unit is installed on the frame. Further, the folding device has a body fixedly disposed on the control rod, an operating unit pivotally installed on the body and able to slide in the sliding trough, and an engagement unit disposed on the body to provide an engagement between the frame and the body. Thus, the positioning unit of the frame can engage with the engagement unit of the folding device to unfold the frame and the control rod for riding. When the engagement between the positioning unit and the engagement unit breaks, the operating unit can slide within the sliding trough from a top side to a bottom side of the sliding trough to allow the frame to extend parallel to the control rod, thereby minimizing the volume of the scooter and increasing the convenience of carrying and stowing after the scooter completes the folding action.

Preferably, a fixing unit is disposed between the frame and the operating unit to position the operating unit on the frame.

Preferably, two rear wheels are located at two sides of the frame.

Preferably, a securing unit is disposed on the frame and located at a place corresponding to the positioning unit to prevent the positioning unit from escaping from the engagement unit.

Preferably, a hub-driving device is installed on the scooter. The hub-driving device has a power source disposed inside the body, a control unit connected to the second handlebar and having a connection with the power source, and a driving unit disposed on the front wheel and driven by the power source to carry out a rotation of the front wheel.

BRIEF DESCRIPTION OF THE DRAWINGS

FIG. 5A is a schematic view showing that the control rod is ready to slide within the sliding trough;

FIG. 5B is a schematic view showing the sliding action of the control rod toward the bottom side of the sliding trough;

FIG. 10 is a schematic view showing a second preferred embodiment of this invention;

FIG. 10A is an enlarged view showing a partial element of FIG. 7A where the securing unit is ready to fix the positioning unit;

DETAILED DESCRIPTION OF THE PREFERRED EMBODIMENTS

Figure 1:
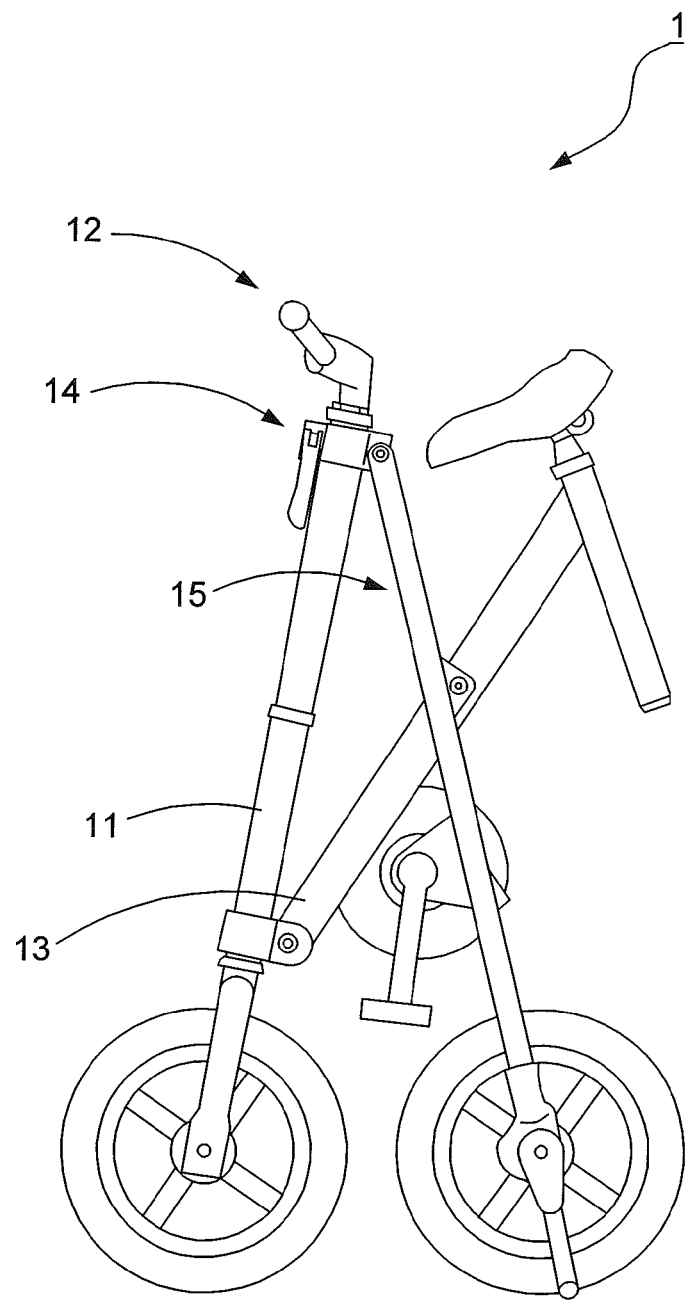
FIG. 1 is a schematic view showing a conventional foldable scooter.
Figure 2:
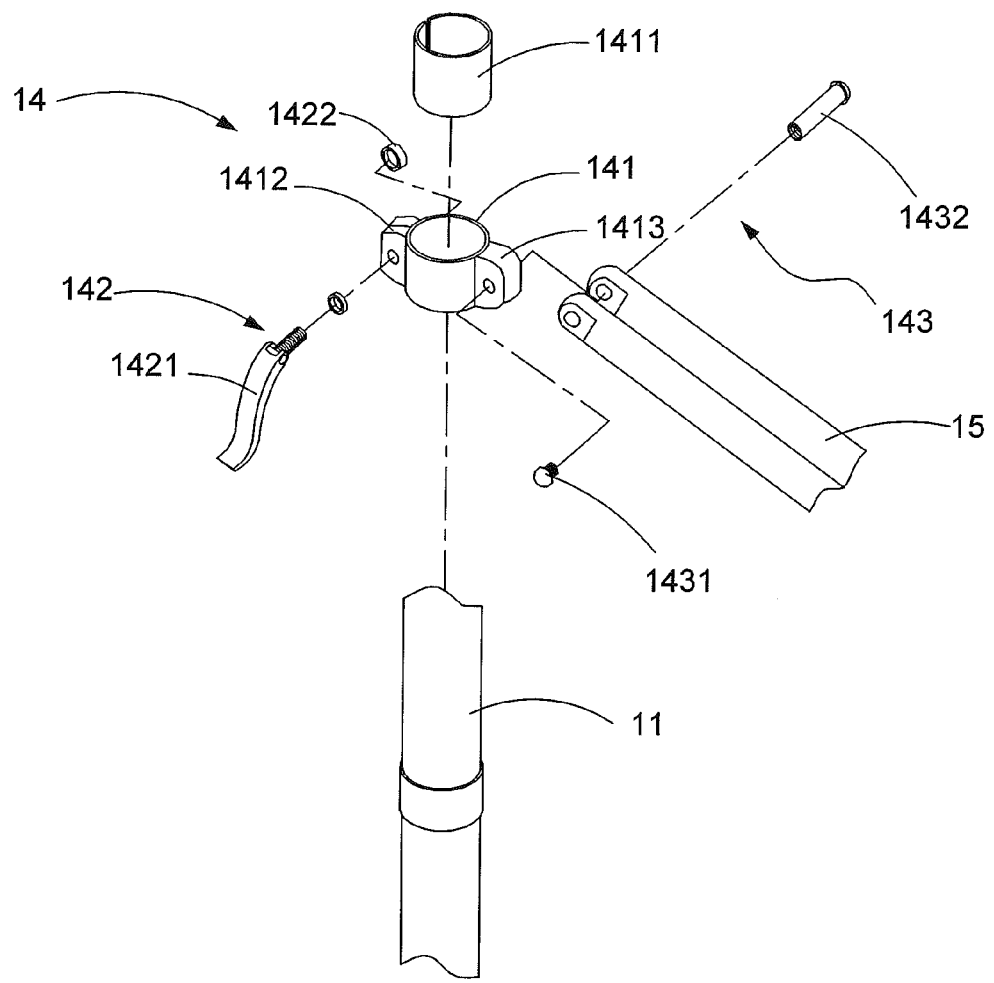
FIG. 2 is an exploded view showing a partial element of FIG. 1.
Figure 3:
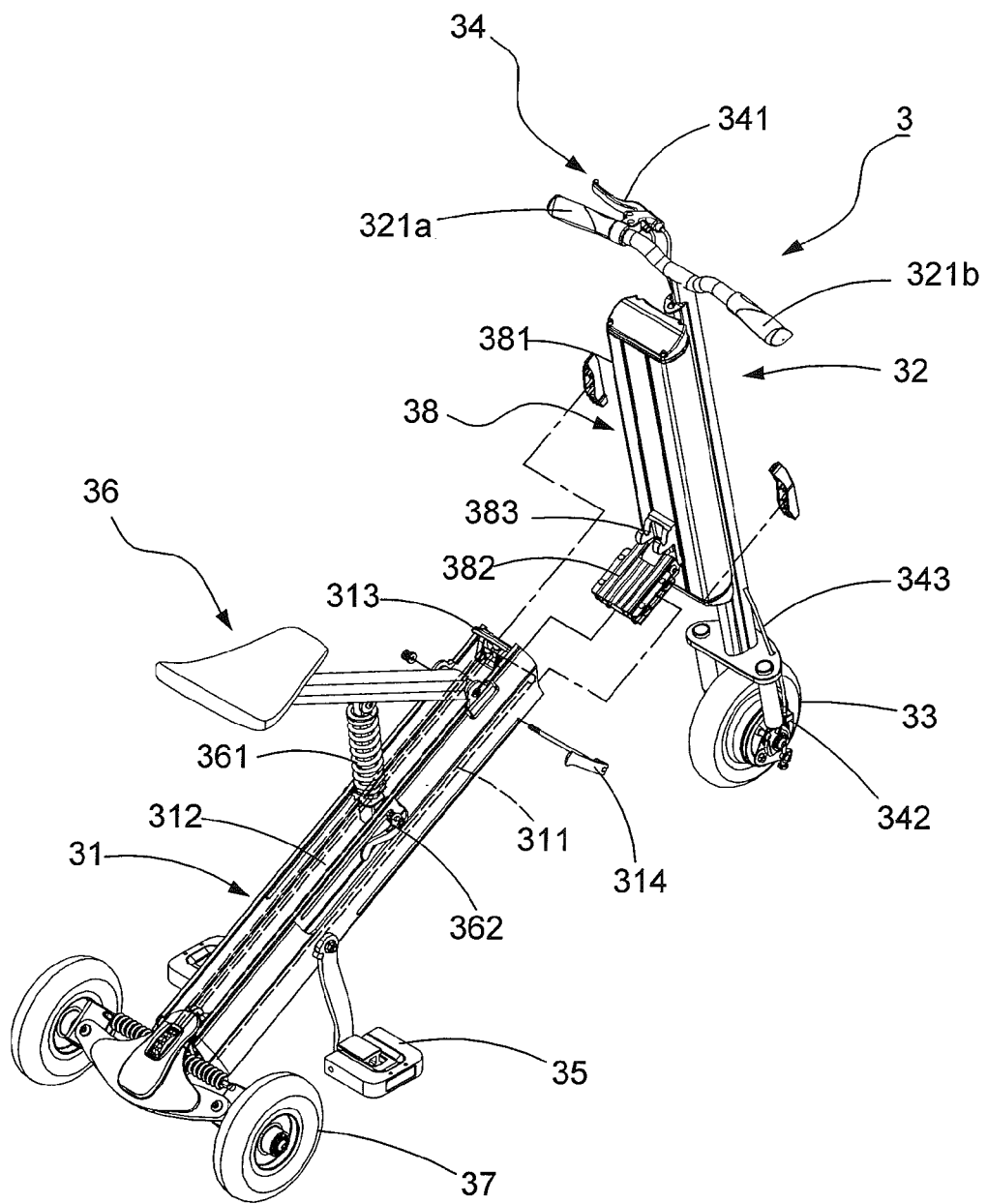
FIG. 3 is an exploded view showing a first preferred embodiment of this invention.

Referring to FIG. 3, a first preferred embodiment of a scooter 3 of this invention includes a frame 31, a control rod 32 connected to the frame 31, a front wheel 33 pivotally disposed on the control rod 32, a braking device 34 located on the control rod 32, two pedals 35 respectively located at two sides of the frame 31, a saddle 36 disposed on the frame 31, at least one rear wheel 37 pivotally disposed on the frame 31, and a folding device 38 set between the frame 31 and the control rod 32. A first handlebar 321a and a second handlebar 321b are respectively formed on the control rod 32 to control the control rod 32 and adjust the moving direction of the front wheel 33. Further, the braking device 34 has a brake controller 341 located on the first handlebar 321a, a brake unit 342 installed on the front wheel 33, and a brake line 343 connecting the brake unit 342 with the brake controller 341 to control a moving speed of the scooter 3. In this embodiment, it is taken as an example that two rear wheels 37 are correspondingly pivotally disposed on two sides of the frame 31.

Figure 4A:
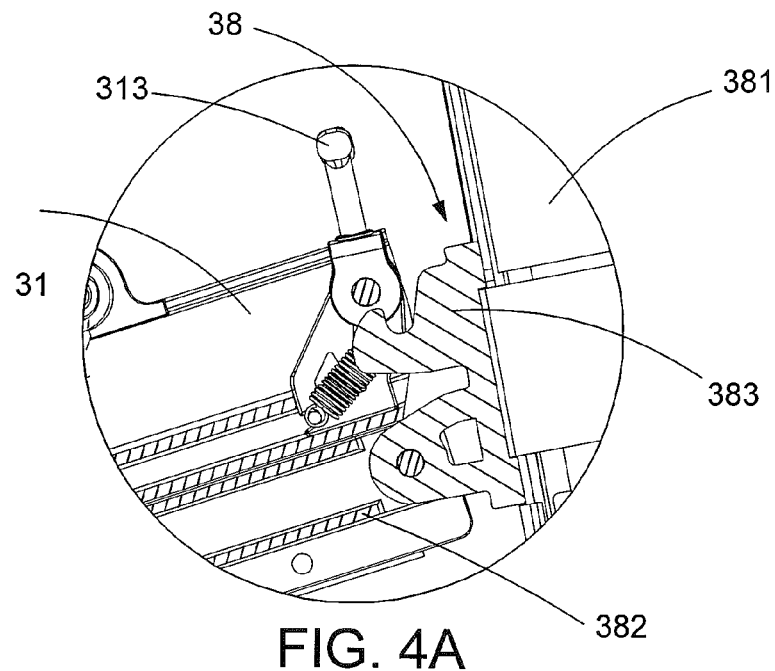
FIG. 4A is an enlarged view showing that the positioning unit is ready to engage with the engagement unit.
Figure 4B:
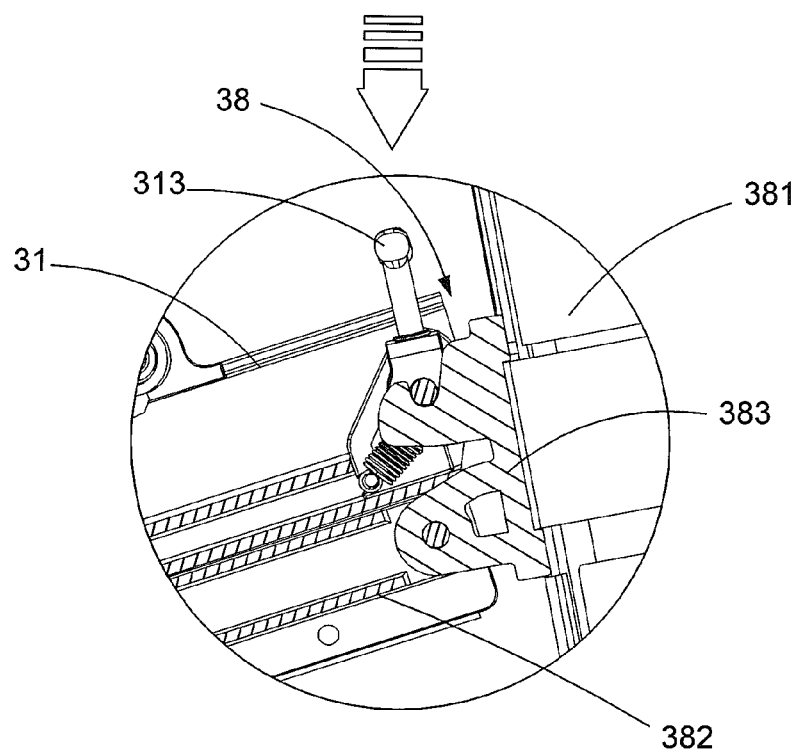
FIG. 4B is an enlarged view showing that the positioning unit completes the engagement with the engagement unit.
Figure 6:
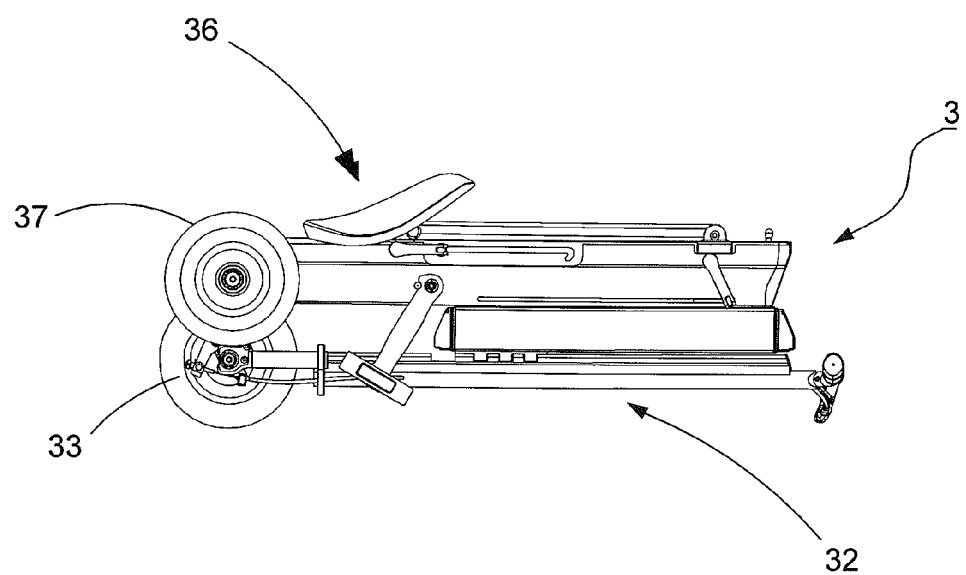
FIG. 6 is a schematic view showing that the scooter is folded completely.

The frame 31 includes a sliding trough 311 formed on a bottom of the frame 31, a sliding rail 312 formed on a top of the frame 31, and a positioning unit 313 set on the frame 31 and set close to the control rod 32. Referring to FIGS. 3 to 5, the folding device 38 has a body 381 installed on the control rod 32 fixedly, an operating unit 382 pivotally situated on the body 381 and capable of sliding within the slide trough 311, and an engagement unit 383 located on the body 381 and providing an engagement with the positioning unit 313 to fix the frame 31 to the body 381 which is disposed on the control rod 32, as shown in FIGS. 4A and 4B, thereby spreading the frame 31 and the control rod 32 to unfold the scooter 3. Alternatively, the positioning unit 313 can be separated from the engagement unit 383 to allow the control rod 32 to slide within the sliding trough 311, as shown in FIGS. 5A and 5B. Thus, the frame 31 and the control rod 32 are parallel to each to become folded, as shown in FIG. 6. This preferred embodiment is characterised in that a fixing unit 314 is located between the frame 31 and the operating unit 382, thereby fixing the operating unit 382 to the frame 31 stably. Thus, the operating unit 382 can be positioned on the frame 31 by the fixing unit 314 to prevent the operating unit 382 from moving within the sliding trough 311 whenever the scooter 3 is unfolded or folded. Further, the saddle 36 has a seat post 361 located at a place corresponding to the sliding rail 312 of the frame 31 and a locking unit 362 fastening the seat post 361 on the sliding rail 312. Thus, the user can adjust the height of the saddle 36 by sliding the seat post 361 within the sliding rail 312 when the locking unit 362 is loose. Alternatively, referring to FIG. 8, the user can move the saddle 36 downward till the seat post 361 of the saddle 36 is parallel with the sliding rail 312 of the frame 31 and use the locking unit 362 to fasten the seat post 361 of the saddle 36 in place.

Figure 7:
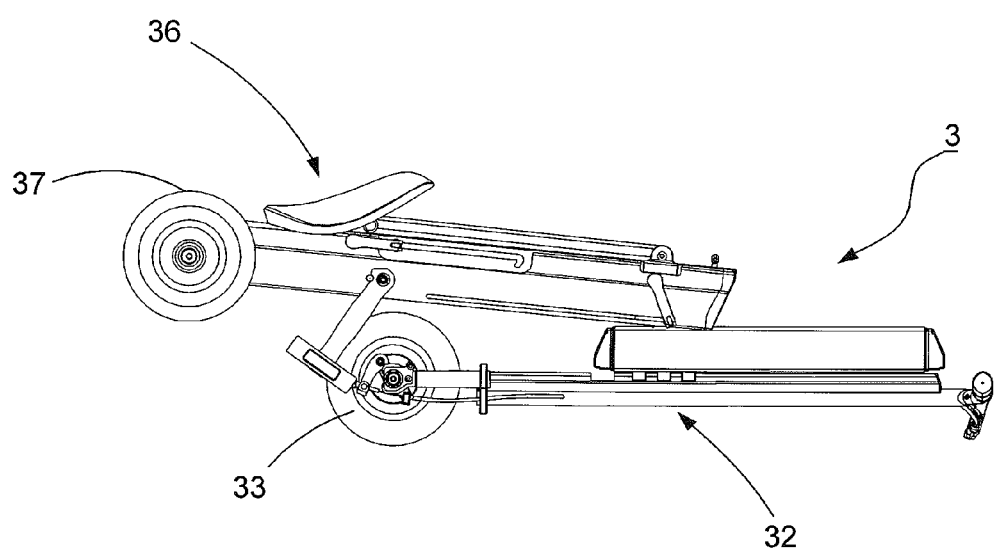
FIG. 7 is a schematic view showing that the control rod slides toward the opposite direction of the frame to spread the scooter.
Figure 8:
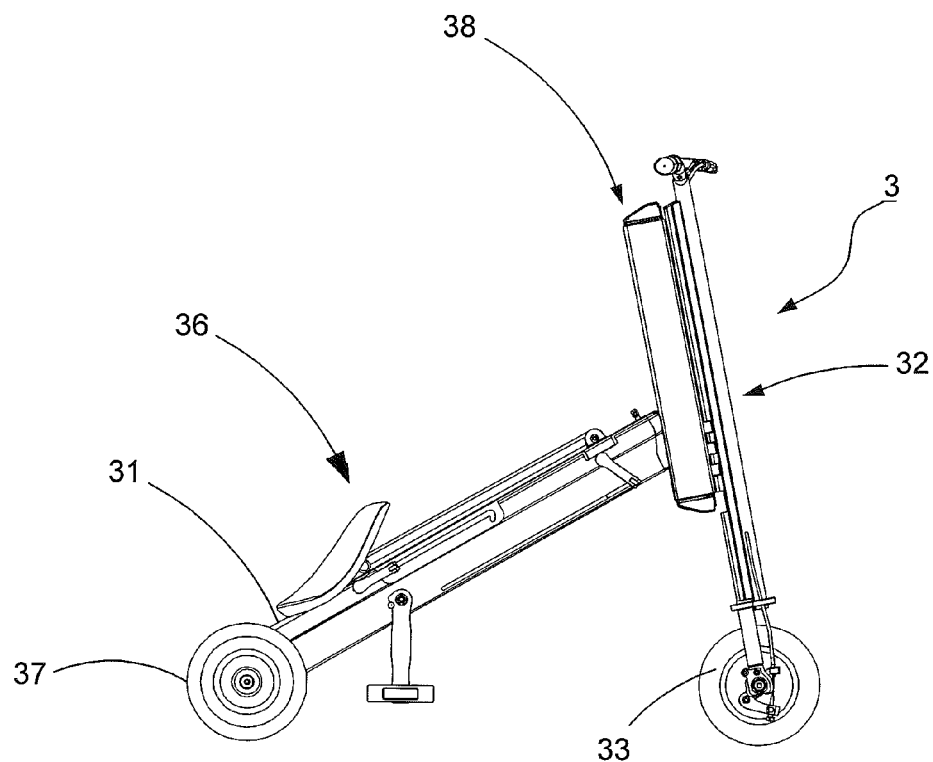
FIG. 8 is a schematic view showing that the control rod completes the spreading action, and the saddle is still folded.
Figure 9:
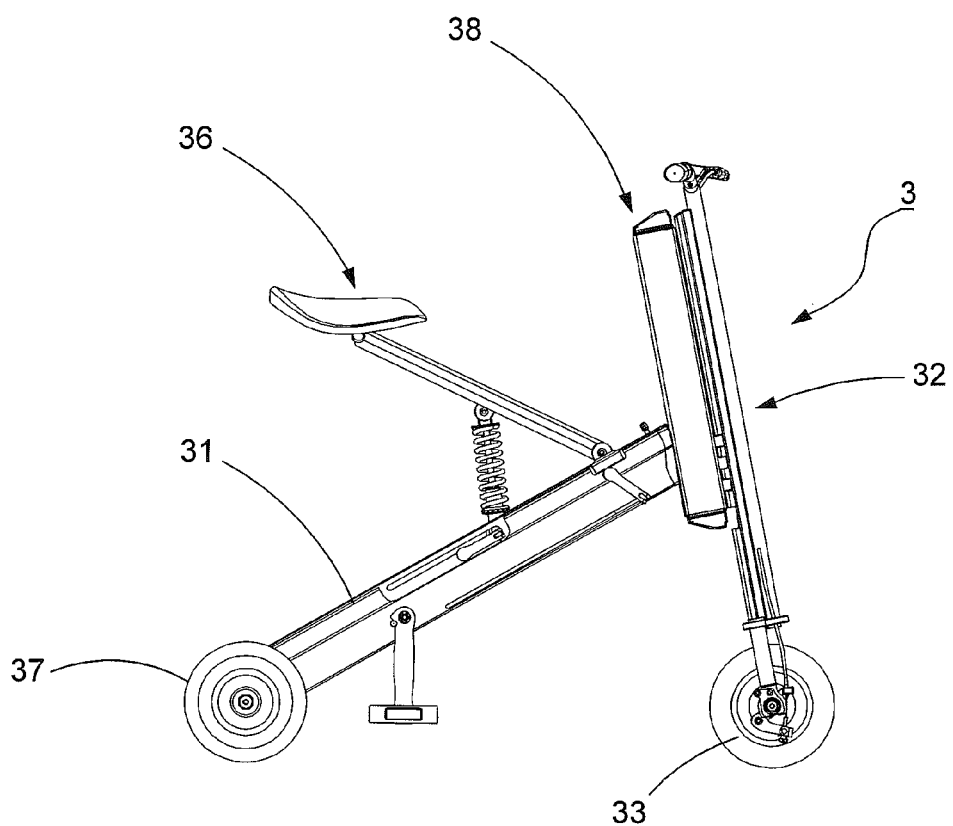
FIG. 9 is a schematic view showing that the scooter completes the entire unfolding operation.
Figure 14:
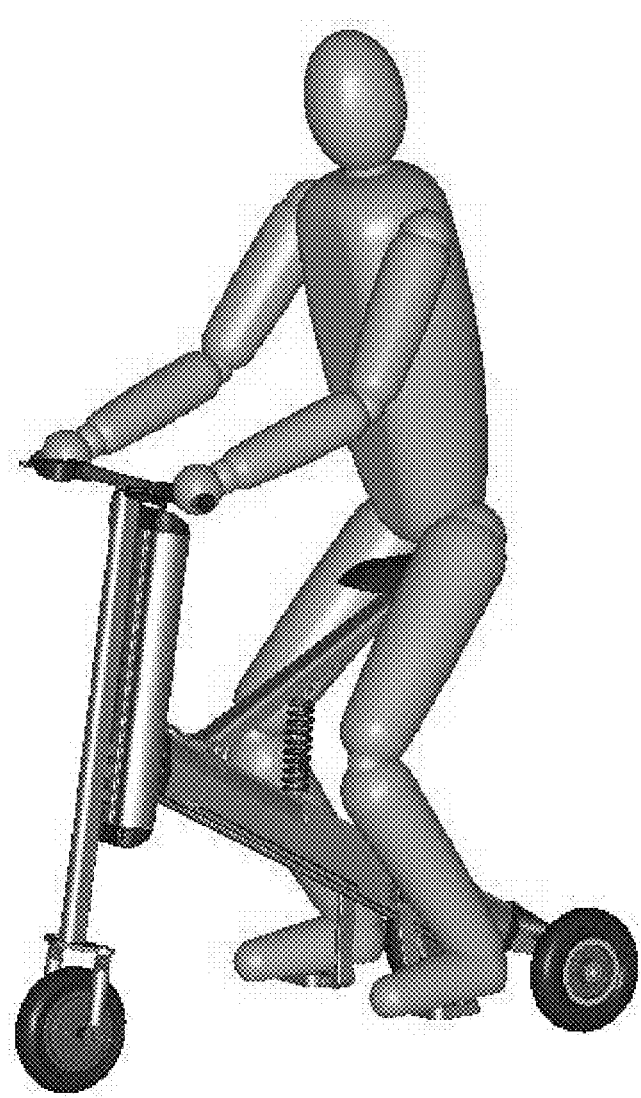
FIG. 14 is a schematic view showing a simulation that the user rides on the scooter in a sitting position.
Figure 15:
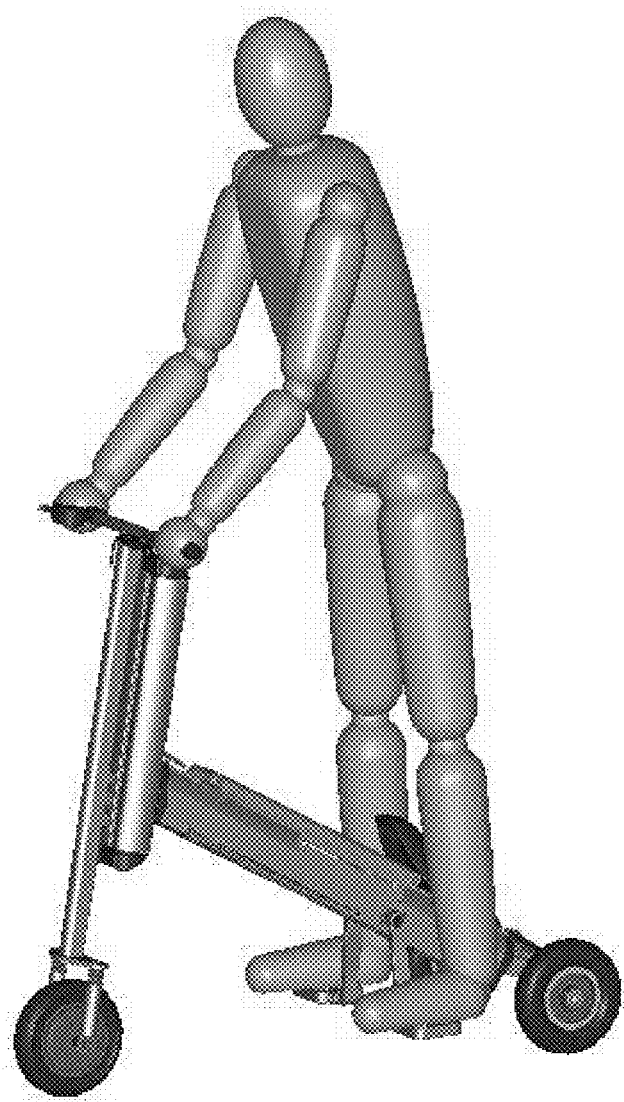
FIG. 15 is a schematic view showing a simulation that the user rides on the scooter in a standing position.

Referring to FIG. 6, to unfold the scooter 3 which is already folded, the unfolding steps are executed by laying down the scooter 3 which is folded and freeing the fixing unit 314 which fixes the operating unit 382 to the frame 31 to enable the operating unit 382 to slide within the sliding trough 311. Then, the operating unit 382 of the folding device 38 is moved from the bottom to the top of the sliding trough 311, and the rear wheels 37 disposed on the frame 31 are moved toward a direction different from the front wheel 33, as shown in FIG. 7. Thus, the scooter 3 starts to spread when the control rod 32 slides and reaches the top of the frame 31 and props up against the frame 31, as shown in FIG. 8 where the control rod 32 and the frame 31 are almost vertical to each other. Finally, the control rod 32 is fixed to the frame 31 by engaging the positioning unit 313 with the engagement unit 383 and adjusting the fixing unit 314 to fasten the operating unit 382 on the frame 31 firmly, thereby completing the extension of the frame 31 and the control rod 32 and achieving the unfolding state of the scooter 3. Meanwhile, the user can change the height of the saddle 36 according to needs by loosening the locking unit 362. Thus, the seat post 361 is not fixed and limited by the locking unit 362 and capable of sliding within the sliding rail 312. The saddle 36 starts moving upward by the support of the seat post 361 which slides within the sliding rail 312 and a distance is formed between the saddle 36 and the frame 31 gradually. Hence, the user can locate the seat post 361 at any location within the sliding rail 312 by fixing the locking unit 362 as shown in FIG. 9. The user can ride in the sitting position as shown in FIG. 14. Alternatively, the user can ride on the scooter 3 by standing on the pedals 35 by keeping the locking unit 362 fixed and keeping the saddle 36 and the frame 31 folded when the frame 31 and the control rod 32 complete the extension as shown in FIG. 8. Therefore, the user can ride the scooter 3 by standing on the pedals 35 as shown in FIG. 15. Thus, the scooter 3 can be unfolded from the folding state with less labor and time by anyone. Further, the scooter 3 can be used by sitting or standing to fit various needs of the user.

If the user needs to fold the scooter 3 after completing riding, the folding device 38 is used to help fold the scooter 3. Specifically, the user needs to confirm whether the saddle 36 is unfolded or not. If the saddle 36 is folded, there is nothing required to be taken by the user. If the saddle 36 is unfolded as shown in FIG. 9, in order to fold the saddle 36 the user needs to unfix the locking unit 362 to enable the seat post 361 to slide within the sliding rail 312. Thus, the saddle 36 is driven by the seat post 361 to transform from the vertical state to become parallel with the frame 31. Then, the user needs to fix the locking unit 362 to prevent the seat post 361 from sliding and complete the folding of the saddle 36 as shown in FIG. 8. Next is to fold the body part of the scooter 3 by breaking the engagement between the positioning unit 313 and the engagement unit 383 to separate the positioning unit 313 with the engagement unit 383. Then, the fixing unit 314 disposed between the frame 31 and the operating unit 382 is loosened to enable the operating unit 382 to slide within the sliding trough 311. With the given force to push the frame 31, the operating unit 382 becomes movable and turns into parallel with the control rod 32 from the vertical state as shown in FIG. 7. Then, the user can push the frame 31 by the movable rear wheels 37 to enable the operating unit 382 which is located at the top of the sliding trough 311 to move toward the bottom of the sliding trough 311 gradually. Thus, the frame 31 and the control rod 32 turn into the folding state from the unfolding state when the rear wheels 37 correspond to the front wheel 33. Final is to fix the fixing unit 314 on the frame 31 to prevent the operating unit 382 from being movable and causing the frame 31 to be incapable of folding with the control rod 32. The scooter 3 completes folding as shown in FIG. 6. Hence, the volume of folded scooter 3 is minimized. Meanwhile, it does not take much time and labor to collect the scooter 3 and anyone can complete the folding actions easily. Therefore, the scooter 3 is easy-carried and convenient to be stored.

Figure 11A:
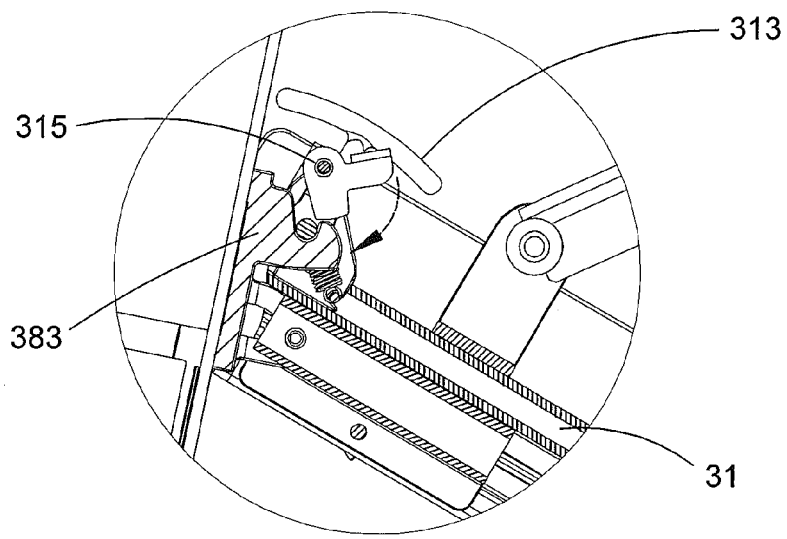
FIG. 11A is an enlarged view showing the process of fixing the positioning unit by the securing unit.
Figure 11B:
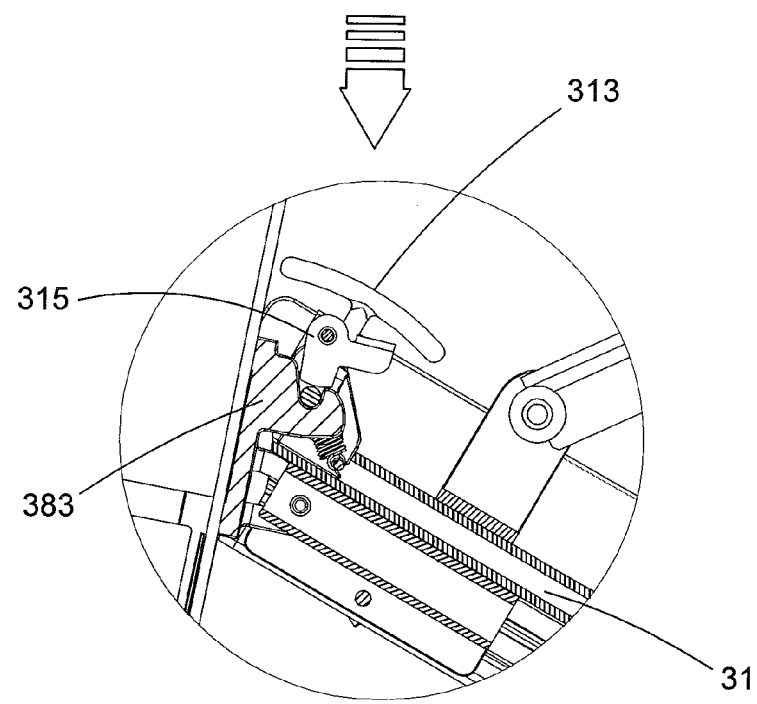
FIG. 11B is an enlarged view showing the engagement between the positioning unit and the engagement unit with the aid of the securing unit.

Referring to FIG. 10 shows a second preferred embodiment of a scooter 3 of this invention. The correlated elements, the concatenation of elements, the operation and objectives of the second preferred embodiment are the same as those of the first preferred embodiment. This embodiment is characterised in that a securing unit 315 is disposed on the frame 31 and located at a place corresponding to the positioning unit 313 to fix and prevent the positioning unit 313 from escaping from the engagement unit 383. Referring to FIGS. 10A, 11A and 11B clearly shows the securing unit 315 from unfixing to fix the positioning unit 313. When the positioning unit 313 engages with the engagement unit 383 to complete the unfolding state of the scooter 3, the user can turn the securing unit 315 to fasten the positioning unit 313 on the engagement unit 383 stably and prevent the positioning unit 313 and the engagement unit 383 from separating by the external force, thereby tightening the security of the scooter 3.

Figure 12:
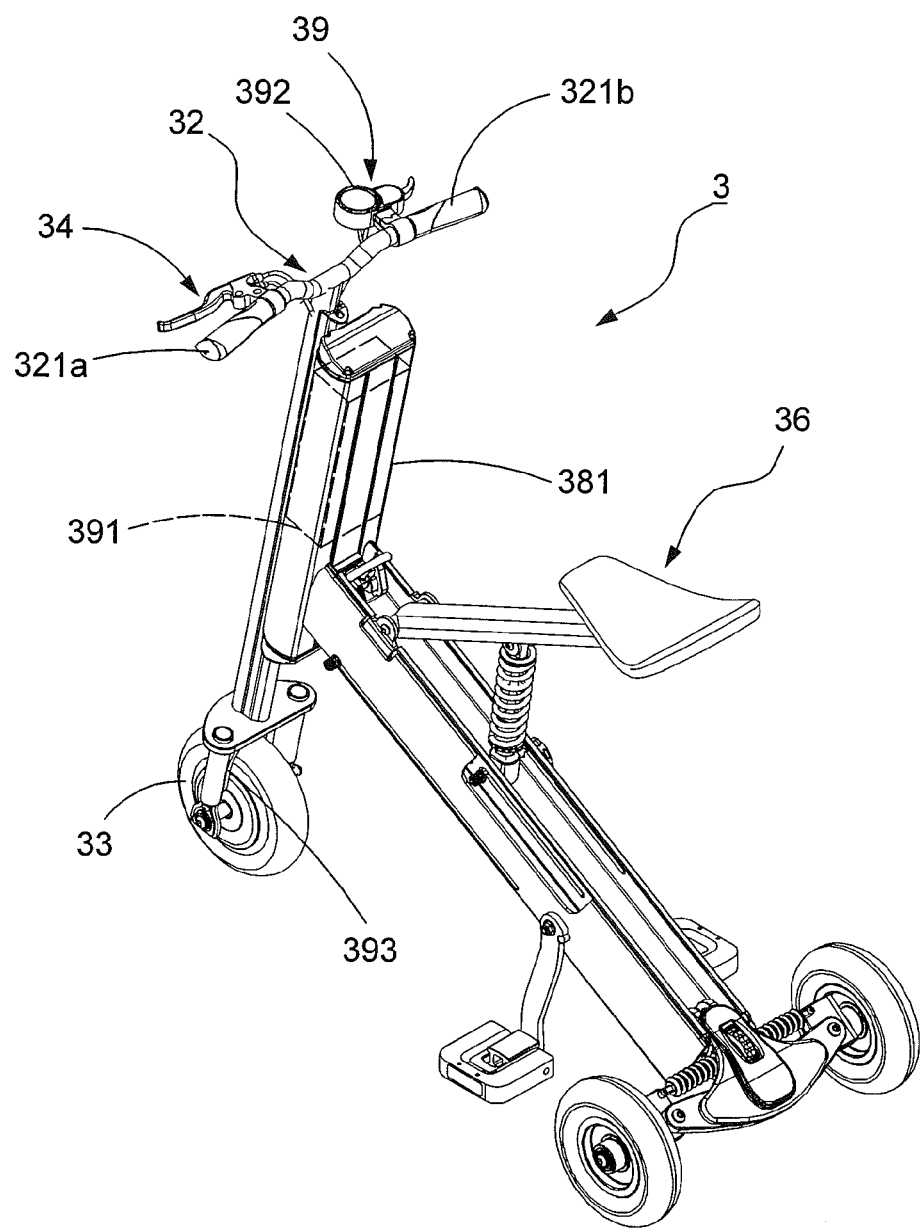
FIG. 12 is a schematic view showing a third preferred embodiment of this invention.

Referring to FIG. 12 showing a third preferred embodiment of a scooter 3 of this invention includes the same correlated elements, the same concatenation of elements, and the same operation and objectives as those of the first preferred embodiment. In this preferred embodiment, the scooter 3 is presented in another viewpoint and it is preferable that a hub-driving device 39 is disposed on the scooter 3. The hub-driving device 39 has a power source 391 disposed inside the body 381, a control unit 392 located on the second handlebar 321b and connecting to the power source 391, and a driving unit 393 installed on the front wheel 33 and driven by the power source 391 to carry out the rotation of the front wheel 33.

Hence, the user can ride the scooter 3 by sitting on the saddle or standing on the pedals 35 with the folded saddle 36 electronically by driving the control unit 392 which is disposed on the second handlebar 321b to link the power source 391 to supply power and activate the driving unit 393 which is located at the front wheel 33. After the driving unit 393 receives the power from the power source 391, the front wheel 33 is driven to rotate by the driving unit 393. Therefore, the scooter 3 is capable of moving by the power automatically. Meanwhile, the user can make use of the braking device 34 situated on the control rod 32 to control the moving speed of the scooter 3 while riding the scooter 3 electronically, thereby increasing the using convenience and the functionality of the scooter 3. If the scooter 3 is done with using, the user can follow the aforementioned folding steps to fold the scooter 3, thereby minimizing the volume of the scooter 3 to be easy-carried and stored conveniently.

Figure 13:
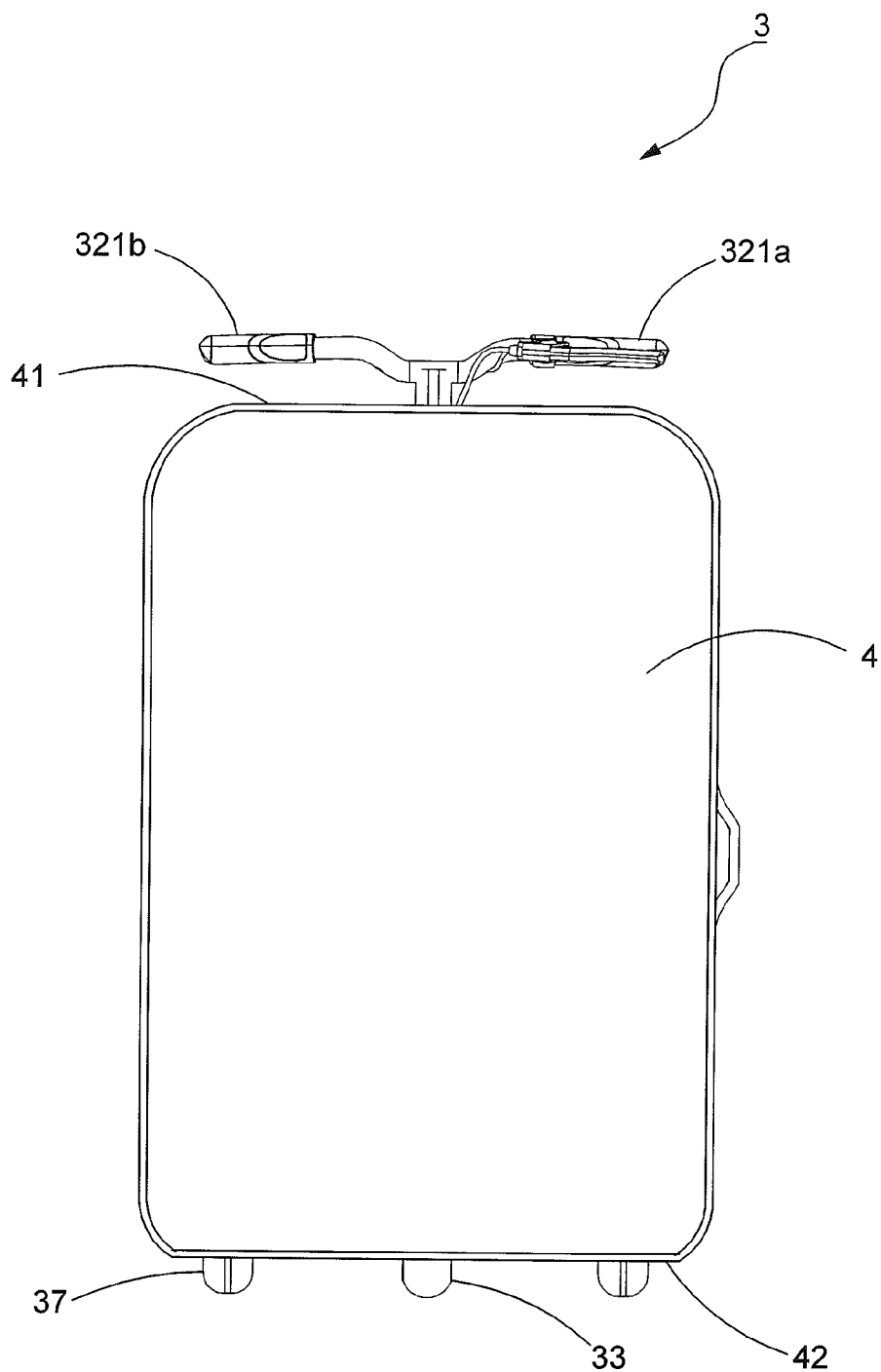
FIG. 13 is a schematic view showing a fourth preferred embodiment of this invention.

Referring to FIG. 13 showing a fourth preferred embodiment of a scooter 3 of this invention has the same correlated elements as those of the first preferred embodiment. It is noted that a case 4 is set to cover the folding scooter 3. The two handlebars 321a, 321b penetrate from a top side 41 of the case 4 and the front and rear wheels 33, 37 which are located at the same side after folding penetrate from a bottom side 42 of the case 4 when the case 4 is applied to pack the folded scooter 3. Thus, the user can carry the case 4 which packs up the scooter 3. Alternatively, the front and rear wheels 33, 37 penetrating from the bottom side 42 of the case 4 provide the rolling effect, thereby the user can wheel the case 4 conveniently to increase the convenience and functionality of the scooter 3 largely.

To sum up, the scooter of this invention takes advantages of the sliding trough disposed on the bottom of the frame and the positioning unit located on the frame. Meanwhile, the folding device is disposed between the frame and the control rod to link the frame and the control rod through the folding device and engage the positioning unit with the engagement unit of the folding device to form the spreading state between the frame and the control rod for using. Moreover, the adjustable saddle is disposed on the frame. Hence, the user can ride the scooter in the sitting or standing positions to provide variations of the scooter. Further, the spreading and folding actions of the scooter are labor-saving that anyone can unfold and fold the scooter with ease. Moreover, the volume of the scooter is minimized after being folded to become easy-carried and convenient to be stowed.

While the embodiments of this invention are shown and described, it is understood that further variations and modifications may be made without departing from the scope of this invention.

What is claimed is:

1. A scooter comprising a frame, a control rod connected to said frame, a front wheel pivotally connected to said control rod, a braking device disposed on said control rod, two pedals respectively located at two sides of said frame, a saddle connected to said frame, and at least one rear wheel pivotally connected to said frame, wherein a first handlebar and a second handlebar are respectively formed on said control rod to control a moving direction of said front wheel, the braking device having a brake controller disposed on said first handlebar, a brake unit disposed on said front wheel, and a brake line connecting said brake unit with said brake controller to control a speed of said scooter,
wherein a sliding trough is formed on a bottom of said frame and a positioning unit is disposed on said frame, a folding device being installed between said frame and said control rod, said folding device having a body fixed to said control rod, an operating unit pivotally disposed on said body and capable of sliding within said sliding trough, and an engagement unit disposed on said body to engage said frame with said body, said positioning unit of said frame being capable of providing an engagement with said engagement unit of said folding device to spread said frame and said control rod.

2. The scooter as claimed in claim 1, wherein a fixing unit is disposed between said frame and said operating unit to position said operating unit on said frame.

3. The scooter as claimed in claim 1, wherein two rear wheels are located at two sides of said frame.

4. The scooter as claimed in claim 1, wherein a securing unit is disposed on said frame and located at a place corresponding to said positioning unit to prevent said positioning unit from escaping from said engagement unit.

5. The scooter as claimed in claim 1, further comprising a hub-driving device, said hub-driving device having a power source disposed inside said body, a control unit connected to said second handlebar and having a connection with said power source, and a driving unit disposed on said front wheel and driven by said power source to carry out a rotation of said front wheel.

* * * * *